US012792432B2

(12) United States Patent
Chemmancherry

(10) Patent No.: US 12,792,432 B2
(45) Date of Patent: Nov. 10, 2026

(54) API TRAFFIC MANAGEMENT AND VISUALIZATION

(71) Applicant: HRB Innovations, Inc., Las Vegas, NV (US)

(72) Inventor: Shylendran Chemmancherry, Overland Park, KS (US)

(73) Assignee: HRB Innovations, Inc., Wilmington, DE (US)

( * ) Notice: Subject to any disclaimer, the term of this patent is extended or adjusted under 35 U.S.C. 154(b) by 563 days.

(21) Appl. No.: 18/221,502

(22) Filed: Jul. 13, 2023

(65) Prior Publication Data

US 2025/0021413 A1 Jan. 16, 2025

(51) Int. Cl.
*G06F 9/54* (2006.01)

(52) U.S. Cl.
CPC .................................... *G06F 9/547* (2013.01)

(58) Field of Classification Search
CPC ........................................................ G06F 9/547
See application file for complete search history.

(56) References Cited

U.S. PATENT DOCUMENTS 9,853,996 B2 * 12/2017 Eliyahu ............... H04L 63/1441
10,992,560 B2 * 4/2021 Leverich ............... H04L 43/106
11,281,552 B2 * 3/2022 Joglekar ............. G06F 11/3037
11,411,923 B2 * 8/2022 Subbarayan ........ H04L 63/1425
2016/0267153 A1 * 9/2016 Witkop ................. G06F 16/285
2024/0185490 A1 * 6/2024 Dibia ..................... G06N 20/10

* cited by examiner

*Primary Examiner* — Wei Y Mu
(74) *Attorney, Agent, or Firm* — Erise IP, P.A.

(57) ABSTRACT

An application programming interface (API) data management and visualization system is disclosed herein. The API data management and visualization system may obtain data indicative of API traffic data from a plurality of APIs and servers. The API traffic data may be reformatted, indexed, and stored by manual programming or machine learning algorithms trained to efficiently index and store the API traffic data. The API traffic data may be stored for low-latency analysis and notification. When data outliers are detected by statistical and machine learning algorithms, notifications and visualization may be displayed by a graphical user interface.

17 Claims, 4 Drawing Sheets

API TRAFFIC MANAGEMENT AND VISUALIZATION

FIELD

Some embodiments described herein are directed to application programming interface (API) data management and visualization. Specifically, embodiments of the current disclosure are directed to an API data indexing and storage system providing low-latency API analytics, notification, and visualization.

BACKGROUND

Typically, a series of software platforms are employed to obtain data from API, process the data, and provide analytics. The API data is typically organized and stored such that a user may interface with an associated graphical user interface (GUI) to request sets of the API data for analysis. The user may then sift through the results to find any irregularities indicating that servers and/or APIs may need maintenance. This is a slow process that leads to slow awareness of potential problems with the networks. The user does not know that there are potential issues with the networks until the user requests an analysis of the data. The slow awareness results in networks being down or functioning inefficiently for extended periods without administrators knowing.

SUMMARY

Generally, embodiments of the present disclosure provide solutions to the above-described problems. Some embodiments of the current disclosure provide an API data management system that obtains API data from the back-end proxies of servers and reformats the data for use with data indexing, storage, and analytics platforms. The API data flow may be obtained in real time and may be indexed and stored, and automatically analyzed to determine if there are any outliers or irregularities in the API data. When irregularities are found, alerts may be sent to a user or administrator, notifying the user of the irregularities and automatically displaying a visualization of the irregularities. This process provides more efficient network management and quicker updating to solve the above-described technical problems.

A first embodiment is directed to an application programming interface (API) data traffic analysis system comprising at least one server configured to process data by at least one API, at least one memory associated with the at least one server, and storing the at least one API, and one or more non-transitory computer-readable media storing computer-executable instruction that, when executed by at least one processor, perform a method of processing API data for visualization. The method comprises receiving, from the at least one server, the API data associated with traffic across the at least one API, reformatting the API data to a format readable by additional platforms, indexing the API data based on a plurality of parameters, storing the API data according to the indexing, receiving a request for the visualization of the API data, providing to a graphical user interface (GUI) the API data associated with the request, and generating at least one data visualization of the API data associated the request by the GUI.

A second embodiment is directed to one or more non-transitory computer-readable media storing computer-executable instructions that, when executed by at least one processor, perform a method of processing application programming interface (API) data for visualization. The method comprises receiving, from at least one server, API data associated with traffic across at least one API, reformatting the API data to a format readable by additional platforms, indexing the API data based on a plurality of parameters, storing the API data according to the indexing, receiving an automated request for the visualization of the API data, providing to a graphical user interface (GUI) the API data associated with the automated request, and generating at least one notification indicative of the API data associated with the automated request.

A third embodiment is directed to a method of processing application programming interface (API) data for visualization. The method comprises receiving, from at least one server, API data associated with traffic across at least one API, reformatting the API data to a format readable by additional platforms, indexing the API data based on a plurality of parameters, storing the API data according to the indexing, receiving a user request for the visualization of the API data, providing to a graphical user interface (GUI) the API data associated with the user request, and generating at least one notification indicative of the API data associated with the user request.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the disclosure will be apparent from the following detailed description of the embodiments and the accompanying drawing figures.

BRIEF DESCRIPTION OF THE DRAWING FIGURES

Embodiments of the disclosure are described in detail below with reference to the attached drawing figures, wherein.

Figure 1:
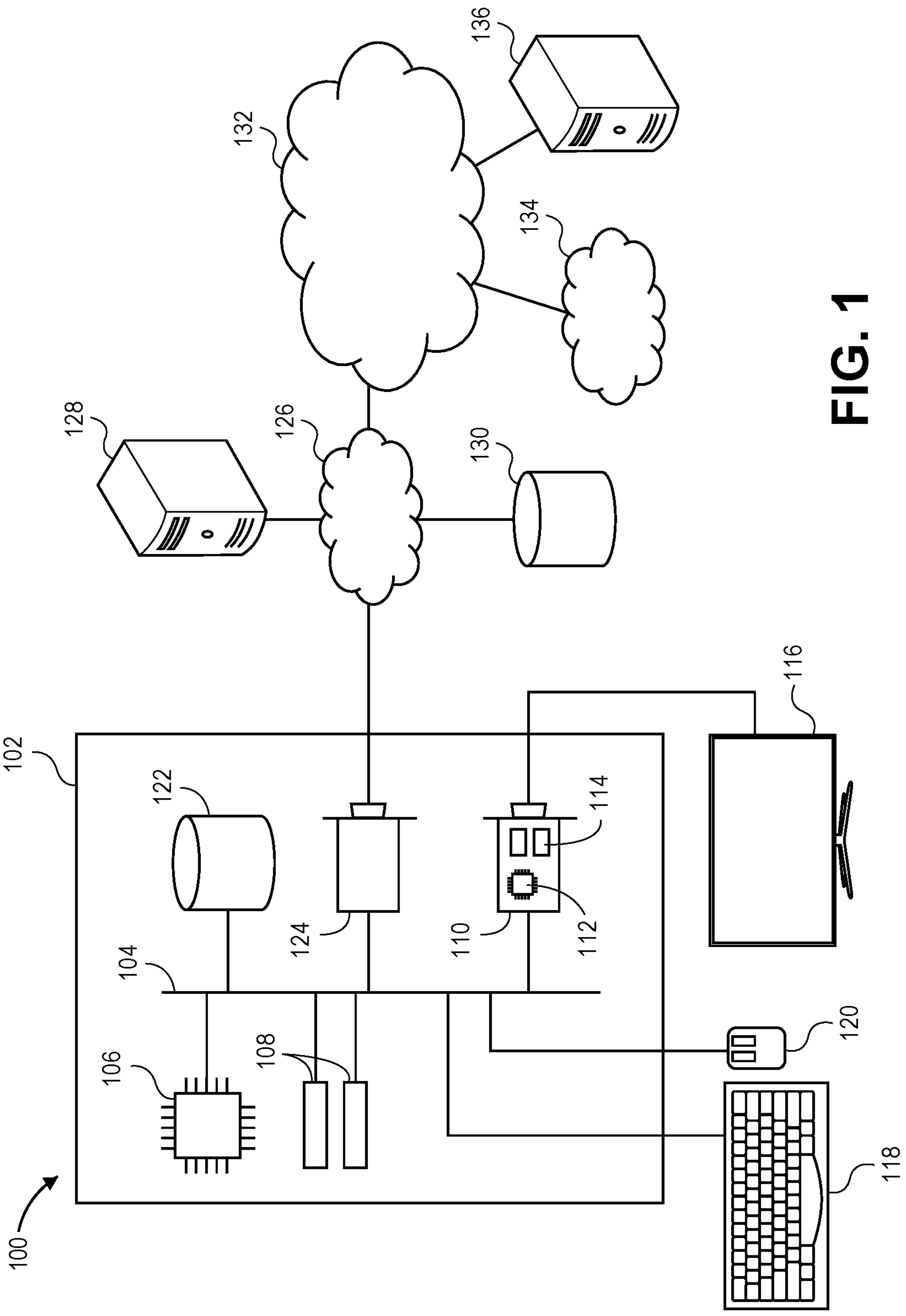
FIG. 1 depicts an exemplary hardware system for embodiments of the disclosure.

The drawing figures do not limit the disclosure to the specific embodiments disclosed and described herein. The drawings are not necessarily to scale, emphasis instead being placed upon clearly illustrating the principles of the disclosure.

DETAILED DESCRIPTION

The following detailed description references the accompanying drawings that illustrate specific embodiments in which the current disclosure can be practiced. The embodiments are intended to describe aspects in sufficient detail to enable those skilled in the art to practice those embodiments of the disclosure. Other embodiments can be utilized, and changes can be made without departing from the scope of the current disclosure. The following detailed description is, therefore, not to be taken in a limiting sense. The scope of the disclosure is defined only by the appended claims, along with the full scope of equivalents to which such claims are entitled.

In this description, references to “one embodiment,” “an embodiment,” or “embodiments” mean that the feature or features being referred to are included in at least one embodiment of the technology. Separate references to “one embodiment,” “an embodiment,” or “embodiments” in this description do not necessarily refer to the same embodiment and are also not mutually exclusive unless so stated and/or except as will be readily apparent to those skilled in the art from the description. For example, a feature, structure, act, etc., described in one embodiment may also be included in other embodiments but is not necessarily included. Thus, the technology can include a variety of combinations and/or integrations of the embodiments described herein.

Embodiments of the present disclosure relate to an API data traffic processing and visualization system (API data management system). In some embodiments, the API data management system may obtain API traffic data from a plurality of APIs on a plurality of servers and process the data for analysis and visualization. The API data may be obtained and reformatted using a proxy associated with the API server log to reconfigure the API data for use by other programs. The API data may then be parsed and indexed into queryable data structures according to various classifications. The API data may then be stored across a plurality of reconfigurable nodes in a datastore accessible by an analytics and visualization engine operable by a graphical user interface GUI. A user may interface with a data analytics and visualization GUI associated with the analytics and visualization engine to request analytics and visualizations of the API data. The requests may be carried out by accessing the stored API data and performing statistical analysis to provide the requested data and visualizations.

Furthermore, in some embodiments, the API data may be automatically analyzed upon receipt in near real-time, and anomalous or irregular data indicators may be sent to the analytics and visualization engine to alert the user of the irregular data. The irregular data may be indicative of errors in the API, security issues (such as, for example, a security breach), high or low traffic, timing issues, provisioning issues, or the like. As such, the user may be alerted of any irregularities in any API or server associated with the API management system. This provides near-real-time awareness of network issues such that the user may quickly resolve the issues.

Figure 2:
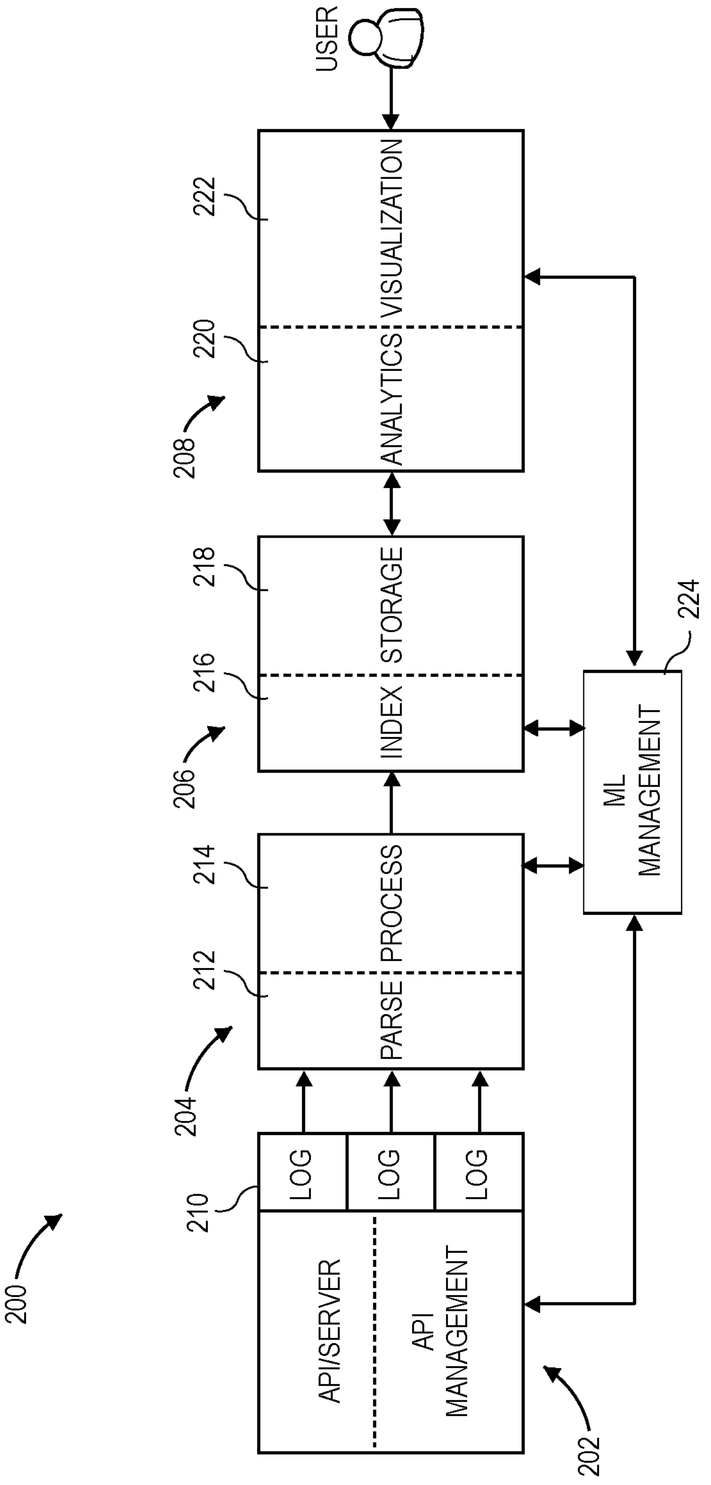
FIG. 2 depicts an exemplary API management and visualization system.

FIG. 1 illustrates one example of a hardware platform representative of an embodiment of hardware system 100 that may comprise API data management and visualization system 200 in the embodiments described below. Computer 102 can be any computer associated with or providing a vehicle instrument cluster and/or any form factor of general- or special-purpose computing device. Depicted with computer 102 are several components, for illustrative purposes. In some embodiments, certain components may be arranged differently or absent. Additional components may also be present. Included in computer 102 is system bus 104, whereby other components of computer 102 can communicate with each other. In certain embodiments, there may be multiple buses or components may communicate with each other directly. Connected to system bus 104 is central processing unit (CPU) 106. Also attached to system bus 104 are one or more random-access memory (RAM) modules 108. Also attached to system bus 104 is graphics card 110. In some embodiments, graphics card 110 may not be a physically separate card but rather may be integrated into the motherboard or the CPU 106. In some embodiments, graphics card 110 has a separate graphics processing unit (GPU) 112, which can be used for graphics processing or for general-purpose computing (GPGPU). GPU 112 may provide graphics and icon generation and validation as described in embodiments below. Also on graphics card 110 is GPU memory 114. Connected (directly or indirectly) to graphics card 110 is display 116 for user interaction. In some embodiments, no display is present, while in others, it is integrated into computer 102. In some embodiments, display 116 is configured to display GUI 300 (FIG. 2). Similarly, peripherals such as keyboard 118 and mouse 120 are connected to system bus 104. Like display 116, these peripherals may be integrated into computer 102 or absent and may be provided as inputs by display 116. Also connected to system bus 104 is local storage 122, which may be any form of computer-readable media and may be internally installed in computer 102 or externally and removably attached.

Computer-readable media include both volatile and nonvolatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store non-transitory data temporarily or permanently. However, unless explicitly specified otherwise, the term “computer-readable media” should not be construed to include physical, but transitory, forms of signal transmission such as radio broadcasts, electrical signals through a wire, or light pulses through a fiber-optic cable. Examples of stored information include computer-useable instructions, data structures, program modules, and other data representations. In particular, computer-readable media includes non-transitory computer-readable media storing computer-executable instructions that, when executed, cause one or more processors to carry out operations.

Finally, network interface card (NIC) 124 is also attached to system bus 104 and allows computer 102 to communicate over a network such as local network 126. NIC 124 can be any form of network interface known in the art, such as Ethernet, ATM, fiber, Bluetooth, or Wi-Fi (i.e., the IEEE 802.11 family of standards). NIC 124 connects computer 102 to local network 126, which may also include one or more other computers, such as computer 128, and network storage, such as data store 130. Generally, a data store such as data store 130 may be any repository from which information can be stored and retrieved as needed. Examples of data stores include relational or object-oriented databases, spreadsheets, file systems, flat files, directory services such as LDAP and Active Directory, or email storage systems. A data store may be accessible via a complex API (such as, for example, Structured Query Language), a simple API providing only read, write, and seek operations, or any level of complexity in between. Some data stores may additionally provide management functions for data sets stored therein, such as backup or versioning. Data stores can be local to a single computer, such as computer 128, accessible on a local network, such as local network 126, or remotely accessible over Internet 132. Local network 126 is, in turn, connected to Internet 132, which connects many networks such as local network 126, remote network 134, or directly attached computers such as computer 136. In some embodiments, computer 102 can itself be directly connected to Internet 132.

FIG. 2 depicts one example of an API data management and visualization system 200. In some embodiments, API data management and visualization system 200 comprises API management platform 202, aggregation and processing platform 204, indexing and storage platform 206, and analytics and visualization platform 208. In some embodiments, API management platform 202 may be configured on servers for obtaining, analyzing, and managing API traffic. API management platform 202 may obtain API data from a plurality of APIs running on a plurality of servers. The API data may be indicative of each API and traffic across each API. In some embodiments, the API data may be indicative of API traffic, including request URL, HTTP status code, various timestamps (e.g., request sent timestamp, response received timestamp, etc.), HTTP methods, simple object access protocol (SOAP) actions (for SOAP APIs), operation name, target endpoint URLs, and the like.

In some embodiments, data logs 210 comprise stored API data indicative of back-end service health and latency monitoring for each API and server of the plurality of APIs and servers. The API data may be stored and analyzed by API data management and visualization system 200 to determine health and efficiency and send alerts if any API data and analytics indicate inefficiencies or irregularities.

In some embodiments, the API data may be any web API associated with a server or client (e.g., a web browser). Embodiments described herein will focus on the server-side API management platforms and analytics and visualization of API traffic data. Furthermore, the description herein focuses on the server-side web service, including any design models for the API, including Simple Object Access Protocol (SOAP) and Representational State Transfer (REST). Generally, embodiments of the disclosure may be associated with and request data from any API.

In some embodiments, API management platform 202 may access and modify proxies of any server-based API to make available specific API data as described above. The API data may be filtered for storage based on any of the above-described data sets, including request URL, HTTP status code, various timestamps (e.g., request sent timestamp, response received timestamp, etc.), HTTP methods, simple object access protocol (SOAP) actions (for SOAP APIs), operation name, target endpoint URLs, and the like. The API data may be filtered and retained in the back-end proxies for obtaining by aggregation and processing platform 204.

In some embodiments, modifying the API proxies modifies the data log format to send the data to data pipelines for processing by aggregation and processing platform 204. As such, the API data associated with the API traffic flow may be made available to other programs in real time. This allows other systems, as described in embodiments herein, to access and analyze the API traffic flow associated with each API of the plurality of servers in real time.

In some embodiments, aggregation and processing platform 204 comprises pipelines for receiving the data from the API management proxies. Aggregation and processing platform 204 may employ Grok pattern to parse the incoming data from API management platform 202 into a structured and queryable format. The API data may be parsed according to classification, data tag, proxy, API, server, data type, or the like. In some embodiments, parsing and processing provide a readable data structure for efficient indexing and querying of the API data for future use in retrieval and analytics. The parsing and processing provided by aggregation and processing platform 204 may be performed in near real-time to process the API data and automatically find irregularities in health and latency analytics, such as delayed network or API traffic.

In some embodiments, the API data may be organized in associated data structures and indexed according to desired analytics and data management by an indexing engine. Indexing and storage platform 206 may utilize indexing element 216 and storage element 218 to provide classifications that may be assigned based on data tags provided by API management platform 202 or aggregation and processing platform 204 based on data associated with the proxy and/or identifiers of the API and/or associated servers and hardware. The API data may be grouped into sets and subsets based on the classifications and may then be stored as indexed in a specific data structure organized and identifiable by a querying system. In some embodiments, indexing and storage platform 206 may be data store 130 described above.

Furthermore, indexing the API data may further create separate access levels for each API. In some embodiments, security levels may be associated with each classification, group of classifications, sets, and/or subsets of classifications. The security levels may be tags or value indicators associated with sets and subsets of API data that may regulate access. When a user requests access to the API data, the user may input identification information such as a password, an identification number, or a biometric input such that the user is identified. The user identity may be associated with a stored security level. The user's security level may provide access to some API data, while other API data may not be accessible when the user's security level is compared to the security level assigned to each API data security indicator. As such, the user may have access to API data across many stored nodes that comprise data associated with the user's security level. Data requests and accessibility is described in more detail in embodiments below.

In some embodiment, the indexed API data may be stored in a memory associated with the at least one processor. The stored API data may be accessible by the at least one processor for making available for analytics and visualization by analytics and visualization platform 208. The stored API data may be stored, as described above, in a queryable format such that a user/automatic request may be processed, and the requested API data may be obtained efficiently.

In some embodiments, the indexing may be managed by machine learning algorithms provided by ML management platform 224. The machine learning algorithms may be trained for efficient data management and providing low-latency analytics and alerts to the user. The machine learning algorithms may be trained to organize the data in efficient data structures based on the use by the user and the API data specific to the use. For example, the API data may be clustered in nodes accessible to the user. The classification and organization of the API data may be such that the most requested API data is stored in the least restrictive path from indexing and storage platform 206 to analytics and visualization platform 208. As such, the machine learning algorithm indexes and stores the data in the most efficient, low-latency process possible. The machine learning algorithms may update the training process continuously or when stored data reaches a usable volume threshold.

Analytics and visualization platform 208 may utilize the at least one processor to provide analytics by analytics engine 220 and visualization by visualization engine 222. In some embodiments, analytics and visualization platform 208 or visualization engine 222 may be GPU 112 associated with the at least one processor. In some embodiments, the user may interface with analytics and visualization platform 208 by GUI 300 depicted in FIG. 3.

Furthermore, ML management platform 224 may provide analysis of the API data to detect outliers/anomalies and classify anomalous data. The API data may be classified based on the health management of the API, the latency in API traffic flow, and security, as described in embodiments herein. In some embodiments, supervised and unsupervised learning algorithms may be employed.

Figure 3:
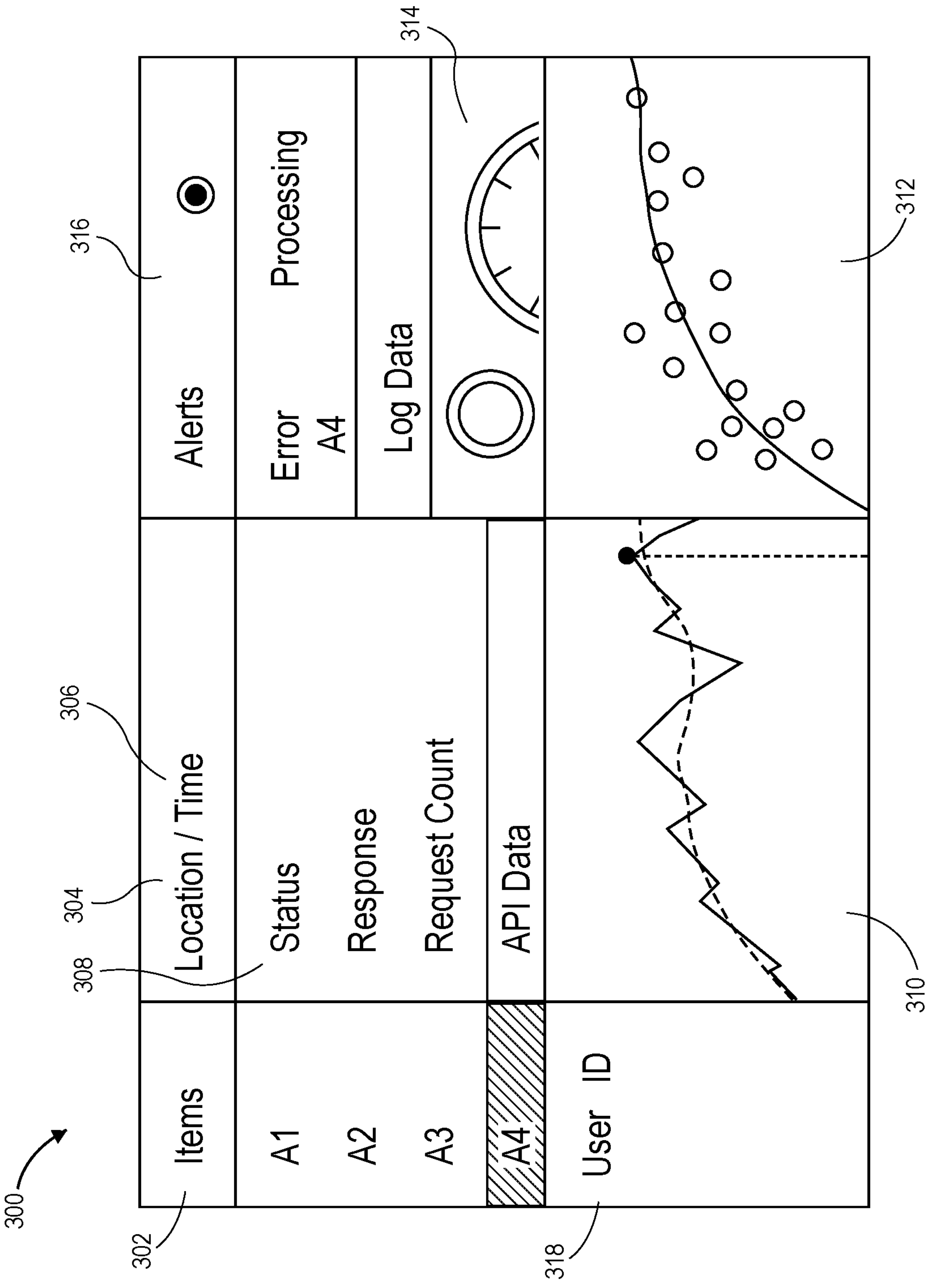
FIG. 3 depicts an exemplary GUI for interaction and visualization.

FIG. 3 depicts an exemplary analytics and visualization GUI (GUI 300) for some embodiments of the invention. In some embodiments, GUI 300 may comprise items list 302 comprising various indicators indicative of servers or API from which API data may be requested. Any information associated with the various servers and API may be displayed under items list 302 or may be accessible by selecting one or more items in items list 302.

In some embodiments, location display/input 304 may be selected, and a location (e.g., region, state, country, IP address, network identifiers, and the like) may be input and/or displayed. All items associated with the location may be displayed in items list 302, and analytics may be provided at first visualization 310. Furthermore, a time or time range may be received by time display/input 306. A time range associated with the location may be associated such that a location and time to evaluate API traffic may be designated. Further, parameters 308 may be defined for evaluation. Parameters 308 may be any set of API data for analysis and display. In some embodiments provided herein, a request, or user request, may comprise parameters 308, location, time, specific servers, specific API, and statistical analysis to be performed on the API data.

In some embodiments, using GUI 300, the user may input time, location, and parameter, and the API data may be obtained from indexing and storage platform 206 (e.g., data store 130) by querying indexing and storage platform 206 for the indexed API data. Analytics and visualization platform 208 may then perform stored and/or defined statistical analysis on the obtained API data to present to the user by GUI 300. For example, the API data may comprise user trends at a specific company associated with a plurality of APIs and servers. The API data may be classified and stored as associated with user data for the company. Furthermore, security data and latency data may be stored as well. The user may receive a notification that API traffic flow is delayed when compared to historical flow data. Further analysis of the API traffic associated with the company may show that a large amount of data is being processed across the network. The user may review the stored API data and find that a company administrator is updating all files on the company system across a secure network. As such, nothing out of the ordinary is detected. In some embodiments, the further analysis may be performed by a classification analytics machine learning algorithm of ML management platform 224. The machine learning algorithm may efficiently check API data based on the issue and a history/likelihood of causes of delays. The machine learning algorithm may determine the cause and send a notification to the user indicative of the issue and the cause and request confirmation. The API data and statistics may be displayed as line charts, scatter plots, and pie charts and by any visualization display such as by first visualization 310, second visualization 312, and/or third visualization 314. This may make it easy for the user to quickly deduce where the irregularities lie and fix the problem.

In some embodiments, alerts 316 may be provided visually on GUI 300, audibly by a peripheral speaker or a mobile device alert, and haptically also in the case of the mobile device. In some embodiments, API data may be monitored in real-time and compared to average or mean numbers based on historical data. For example, the API data may be stored, and/or statistics associated with the API data may be stored and compared to the real-time flow of API data stored in indexing and storage platform 206. In some embodiments, the API data flow may be compared to the historical data by trained classification algorithms to determine outliers and/or a high likelihood of health and latency issues. When issues are detected, or a plurality of outliers are detected over time, an alert may be automatically initiated. As such, the user may be informed of the potential for health and/or latency issues in near real-time.

In some embodiments, the user may be logged into the API management system via GUI 300, and user ID 318 representing a user security level may be displayed. API data management and visualization system 200 may store the user credentials, which, in some embodiments, comprise security access levels. For example, the user may be an analyst and only have access to the data and data processing features, or the user may be an administrator and have access to modify the code for obtaining, indexing, storage, processing, and display of the API data. In some embodiments, the user may only have access to some API data stored at indexing and storage platform 206. The API data may be indexed according to security levels. Accordingly, the user identification may be checked when attempting to access API data. The identification may be checked upon receiving the user request such that the data that is not accessible is not permitted for query or may be filtered after obtained. Either way, the API data may not be accessible to users of various security levels according to the index identifiers compared to the user identification credentials.

In some embodiments, machine learning algorithms may be trained to determine irregular traffic data. In some embodiments, anomalous or irregular data may be indicative of a security threat and detected by ML management platform 224. The irregular data may be an attack or an attempted attack on the network, and the stored API data may reflect this difference in API traffic flow. The machine learning algorithms may be trained on data indicative of known software attacks such that these markers in the API traffic flow are detected and classified. Furthermore, when these attacks are detected, alerts may be sent to analytics and visualization platform 208 for display by GUI 300. Furthermore, notifications may be sent in real-time to mobile devices associated with administrators/users of API data management and visualization system 200.

Figure 4:
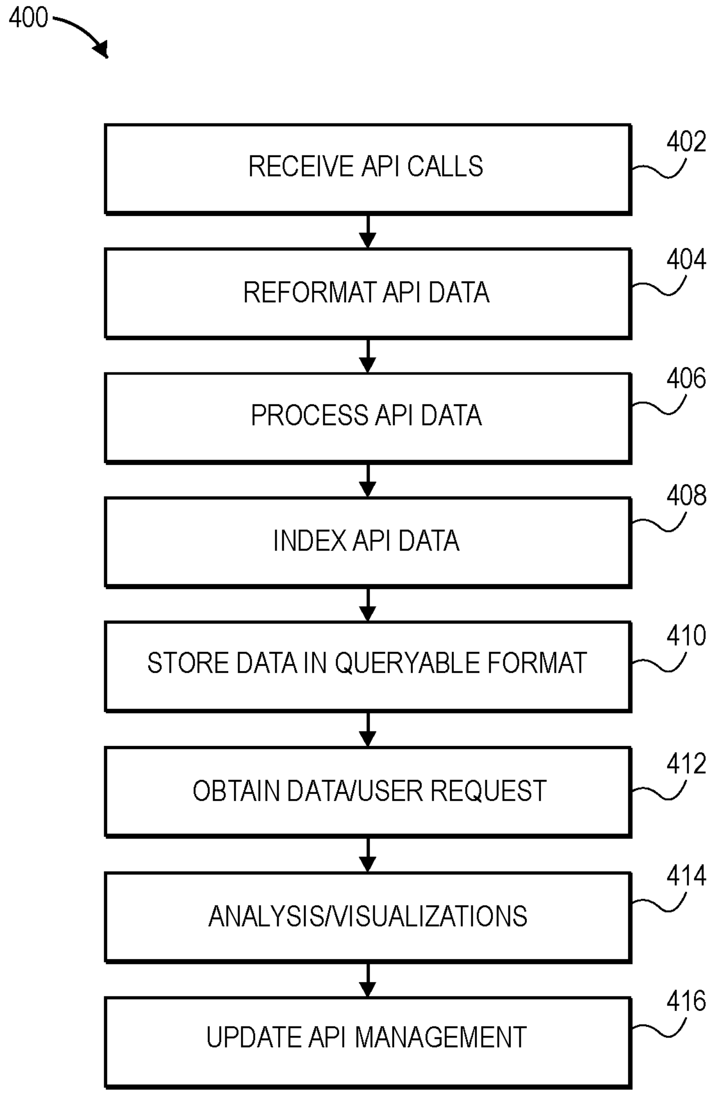
FIG. 4 depicts an exemplary process of API management and visualization.

FIG. 4 depicts an exemplary workflow process of API data management and visualization system 200, generally referenced by the numeral 400. At step 402, API data management and visualization system 200 may receive API calls from users accessing the associated network across the plurality of API and associated servers. The API traffic may be monitored in real-time, generating API data flows. The API data flow may comprise user identifiers, company identifiers, system identifiers (e.g., hardware components and registration), web addresses, communication data, and the like.

At step 404, the API data may be transmitted to the backend proxies (e.g., data logs 210) as described above. Here, the API data may be reformatted and stored to use with associated systems, such as aggregation and processing platform 204, indexing and storage platform 206, and analytics and visualization platform 208.

At step 406, the API data may be obtained by aggregation and processing platform 204. Aggregation and processing platform 204 may comprise parsing engine 212 and processing engine 214 for parsing and processing the API data. Aggregation and processing platform 204 may reorganize the API data and add identifiers to designate the data for indexing by indexing and storage platform 206, as described in embodiments above.

At step 408, the API data may be indexed. The API data may be indexed according to various attributes and/or tags of the API data. The API data may be indexed according to various parameters as described in embodiments above. The various parameters may comprise server/hardware identification, API identification, location, time, user identification, company identification, security level, web resource association, web browser, network identification, and the like. As such, the API data may be indexed in any way that may be customized by an administrator to provide the most efficient access to users of API data management and visualization system 200. In some embodiments, the indexing may be managed by machine learning algorithms trained on efficient data management and providing low latency analytics and alerts to the user, as described in embodiments above.

At step 410, the indexed API data is stored in queryable and accessible data structures as defined by the administrator and/or user or by the managing machine learning algorithm. The API data may be stored based on the above-described indexing. Furthermore, identifiers such as classifications, tags, values, and the like may be associated and stored with the indexed API data such that the requested API data may be retrieved in a most efficient process as described in embodiments above.

At step 412, the user of API data management and visualization system 200 may provide a request by GUI 300. For example, the user may provide a request for API traffic data comprising location, time, and company identification. The request may be processed by indexing and storage platform 206 and/or ML management platform 224, and API data that meets each criterion provided by the user may be provided. As such, the API data may be obtained from separate columns, rows, files, nodes, or the like and organized into a format for providing the requested API data to analytics and visualization platform 208.

In some embodiments, as described above, the request may be automatically generated based on the identification of irregular data and/or health and latency issues. In some embodiments, the request may not be sent directly by the user but may be automatic based on API data flow analyzed by ML management platform 224. As described in embodiments above, the API data may be tracked and analyzed in real-time based on the trained machine learning models. When irregular or anomalous data is detected, a request for identifiers associated with that particular API data may be generated. As such, a request for API data may be automatically generated, and the API data associated with the request may be automatically sent for processing by analytics and visualization platform 208.

At step 414, the API data is processed for visualization and display. In some embodiments, the API data may be received by analytics and visualization platform 208. The API data may be processed according to the request from the user and/or ML management platform 224. Continuing with the example described above, the request may include time, location, and company. As such, GUI 300 may provide API traffic data from the requested time from and from API associated with the particular company. The user may further narrow the request by adding further parameters. The at least one processor, GPU 112 in this case, may provide graphs and API data by GUI 300.

At step 416, API data management and visualization system 200 may receive input from the user to update aggregation and processing platform 204, indexing and storage platform 206, and analytics and visualization platform 208 based on the results of the API data visualization and analysis. Furthermore, the user may update API and/or servers based on the results. In some embodiments, machine learning algorithms may be trained to not only recognize the irregular data but to associate the irregular data with common problems. As such, API data management and visualization system 200 may troubleshoot the most likely issues and provide recommendations to the user based on the most likely solutions to the most likely issues.

Although current disclosure has been described with reference to the embodiments illustrated in the attached drawing figures, it is noted that equivalents may be employed and substitutions made herein without departing from the scope of the disclosure as recited in the claims.

Having thus described various embodiments, what is claimed as new and desired to be protected by Letters Patent includes the following:

1. An application programming interface (API) data traffic analysis system comprising:
- at least one server configured to process data by at least one API;
- at least one memory associated with the at least one server and storing the at least one API; and
- one or more non-transitory computer-readable media storing computer-executable instruction that, when executed by at least one processor, perform a method of processing API data for visualization, the method comprising:
- receiving, from the at least one server, the API data associated with traffic across the at least one API;
- reformatting the API data to a format readable by additional platforms;
- analyzing the API data using a machine learning model trained to organize the API data by request quantity;
- storing the API data across a network of nodes,
- wherein the API data is stored across the network of nodes to provide most requested data in a least restrictive path;
- indexing the API data based on the storing;
- receiving, by a machine learning algorithm, a request for the visualization of the API data;
- providing to a graphical user interface (GUI) the API data associated with the request;
- causing display of a notification indicative of a state of the API data; and
- generating at least one data visualization of the API data associated with the request by the GUI.

2. The API data traffic analysis system of claim 1, wherein the API data is indicative of one of a health of the at least one API or a latency in a flow of the API data.

3. The API data traffic analysis system of claim 1, wherein the API data is indicative of an attempted network security breach.

4. The API data traffic analysis system of claim 1, wherein the method further comprises:
- indexing the API data based on a plurality of parameters,
- wherein a parameter of the plurality of parameters is an identifier of simple object access protocol API.

5. The API data traffic analysis system of claim 4, wherein the plurality of parameters further comprises a request URL, an HTTP status code, a request sent timestamp, a response received timestamp, an HTTP method, a SOAP action, an operation name, or target endpoint URL.

6. The API data traffic analysis system of claim 5, wherein the request is for a statistical analysis of a set of parameters of the plurality of parameters.

7. The API data traffic analysis system of claim 1, wherein the method further comprises:

comparing an identity of a user with a stored security level; and in response, providing access to the API data.

8. One or more non-transitory computer-readable media storing computer-executable instruction that, when executed by at least one processor, perform a method of processing application programming interface (API) data for visualization, the method comprising:

receiving, from at least one server, API data associated with traffic across at least one API;

reformatting the API data to a format readable by additional platforms;

analyzing the API data using a machine learning model trained to organize the API data by request quantity;

storing the API data across a set of nodes comprising a subset of nodes accessible by a user, wherein the API data is stored across the set of nodes to provide most requested data in a least restrictive path based on a query by the user;

indexing the API data based on the storing and a plurality of parameters;

analyzing the API data by a machine learning algorithm to determine at least one outlier associated with the API data;

generating an automated request to the visualization of the API data based on the at least one outlier;

receiving an automated request for the visualization of the API data;

providing to a graphical user interface (GUI) the API data associated with the automated request; and generating at least one notification indicative of the API data associated with the automated request.

9. The media of claim 8, wherein the method further comprises:

causing display of the at least one notification by the GUI; and causing display of at least one statistical analysis of the API data associated with the automated request.

10. The media of claim 8, wherein the plurality of parameters comprises a request URL, an HTTP status code, a request sent timestamp, a response received timestamp, an HTTP method, a SOAP action, an operation name, or target endpoint URL.

11. The media of claim 8, wherein the at least one outlier is indicative of an attempted network security breach.

12. The media of claim 8, wherein the at least one outlier is indicative of higher-than-usual delays in API traffic.

13. A method of processing application programming interface (API) data for visualization, the method comprising:

receiving, from at least one server, API data associated with traffic across at least one API;

reformatting the API data to a format readable by additional platforms;

analyzing the API data using a machine learning model trained to organize the API data by request quantity;

storing the API data across a set of nodes comprising a subset of nodes accessible by a user, wherein the API data is stored across the set of nodes to provide most requested data in a least restrictive path;

indexing the API data based on a plurality of parameters and the storing;

analyzing the API data by a machine learning algorithm to determine at least one outlier associated with the API data;

generating an automated request to the visualization of the API data based on the at least one outlier:

receiving a user request for the visualization of the API data;

providing to a graphical user interface (GUI) the API data associated with the automated request; and generating at least one notification indicative of the API data associated with the automated request.

14. The method of claim 13, further comprising:

causing display of the at least one notification by the GUI; and causing display of at least one statistical analysis of the API data associated with the automated request.

15. The method of claim 13, wherein the plurality of parameters comprises a request URL, an HTTP status code, a request sent timestamp, a response received timestamp, an HTTP method, a SOAP action, an operation name, or target endpoint URL.

16. The method of claim 13, wherein the at least one outlier is indicative of an attempted network security breach.

17. The method of claim 13, wherein the at least one outlier is indicative of higher-than-usual delays in API traffic and a potential cause of the higher-than-usual delays.

* * * * *